United States Patent
Nishida et al.

(10) Patent No.: US 9,516,556 B2
(45) Date of Patent: Dec. 6, 2016

(54) PATH ESTABLISHMENT METHOD, ACCESS NETWORK SWITCHING METHOD, ACCESS NETWORK SWITCHING APPARATUS, MOBILE STATION, AND PROXY ACCESS NETWORK SWITCHING APPARATUS

(75) Inventors: Katsutoshi Nishida, Tokyo (JP); Akimichi Tanabe, Kawasaki (JP)

(73) Assignee: NTT DOCOMO, INC., Tokyo (JP)

( * ) Notice: Subject to any disclaimer, the term of this patent is extended or adjusted under 35 U.S.C. 154(b) by 1078 days.

(21) Appl. No.: 12/663,736

(22) PCT Filed: Jun. 11, 2008

(86) PCT No.: PCT/JP2008/060677
§ 371 (c)(1),
(2), (4) Date: Apr. 8, 2010

(87) PCT Pub. No.: WO2008/156019
PCT Pub. Date: Dec. 24, 2008

(65) Prior Publication Data
US 2010/0202323 A1    Aug. 12, 2010

(30) Foreign Application Priority Data

Jun. 18, 2007   (JP) ................. 2007-160702

(51) Int. Cl.
*H04W 36/14*   (2009.01)
*H04W 40/36*   (2009.01)
(Continued)

(52) U.S. Cl.
CPC ......... *H04W 36/0016* (2013.01); *H04W 36/14* (2013.01); *H04W 40/36* (2013.01); *H04W 88/182* (2013.01); *H04W 80/04* (2013.01)

(58) Field of Classification Search
CPC ... H04W 36/00; H04W 40/00; H04W 76/00; H04W 80/04; H04W 88/182
USPC .......................... 370/331–334; 455/436–444
See application file for complete search history.

(56) References Cited

U.S. PATENT DOCUMENTS 6,507,567 B1 * 1/2003 Willars .................. 455/436
2004/0102194 A1 * 5/2004 Naghian et al. ........... 455/436
(Continued)

FOREIGN PATENT DOCUMENTS

| JP | 2003-534714 A | 11/2003 |
|---|---|---|
| JP | 2005-311702 A | 11/2005 |

(Continued)

OTHER PUBLICATIONS

International Search Report w/translation from PCT/JP2008/060677 dated Sep. 16, 2008 (8 pages).
(Continued)

Primary Examiner — Timothy J Weidner
(74) Attorney, Agent, or Firm — Osha Liang LLP

(57) ABSTRACT

In a mobile communication system including a mobile station, an access apparatus for performing connection control between the mobile station and an access network, and an access network switching apparatus for switching access networks to communicate with the mobile station, the mobile station establishes a first path to communicate with the access apparatus, when the mobile station enters a coverage area of the access apparatus. The access apparatus establishes a second path to communicate with the access network switching apparatus when the first path is established. The access network switching apparatus switches the access networks when a predetermined condition is satisfied.

9 Claims, 15 Drawing Sheets

(51) Int. Cl.
*H04W 88/18* (2009.01)
*H04W 36/00* (2009.01)
*H04W 80/04* (2009.01)

(56) References Cited

U.S. PATENT DOCUMENTS

| | | | |
|---|---|---|---|
| 2005/0088994 A1* | 4/2005 | Maenpaa et al. | 370/331 |
| 2005/0157681 A1 | 7/2005 | Tajima | |
| 2006/0018291 A1 | 1/2006 | Patel et al. | |
| 2006/0045049 A1* | 3/2006 | Chung et al. | 370/331 |
| 2007/0113075 A1* | 5/2007 | Jo et al. | 370/401 |
| 2007/0133467 A1 | 6/2007 | Hsu et al. | |
| 2008/0186925 A1* | 8/2008 | Cheng et al. | 370/338 |
| 2008/0207206 A1* | 8/2008 | Taniuchi et al. | 455/436 |
| 2009/0016300 A1* | 1/2009 | Ahmavaara et al. | 370/331 |
| 2009/0043902 A1* | 2/2009 | Faccin | 709/229 |
| 2009/0073935 A1* | 3/2009 | Xia et al. | 370/331 |
| 2009/0303966 A1* | 12/2009 | Cherian et al. | 370/331 |
| 2010/0226256 A1* | 9/2010 | Kato et al. | 370/241 |
| 2010/0226313 A1* | 9/2010 | Sugimoto et al. | 370/328 |
| 2010/0260123 A1* | 10/2010 | Sugimoto et al. | 370/329 |
| 2010/0272063 A1* | 10/2010 | Kato et al. | 370/331 |

FOREIGN PATENT DOCUMENTS

| | | |
|---|---|---|
| JP | 2006-222616 A | 8/2006 |
| WO | 01/91382 A1 | 11/2001 |
| WO | 2007/015574 A1 | 2/2007 |
| WO | 2007/036764 A1 | 4/2007 |

OTHER PUBLICATIONS

Written Opinion from PCT/JP2008/060677 dated Sep. 16, 2008 (6 pages).
Gundavelli, S. et al.; "Proxy Mobile IPv6"; NETLMM WG Internet-Draft draft-ietf-netlmm-proxymip6-00.txt; Apr. 8, 2007 (46 pages).
Patent Abstracts of Japan; Publication No. 2006-222616 dated Aug. 24, 2006; Matsushita Electric Industrial Co., Ltd. (1 page).
Patent Abstracts of Japan; Publication No. 2005-311702 dated Nov. 4, 2005; Mitsubishi Electric Corp. (1 page).
3GPP TS 23.401 V1.0.0; "CPRS enhancements for E-UTRAN access"; May 2007 (50 pages).
3GPP TS 23.402 V1.0.0; "Architecture Enhancements for non-3GPP accesses"; May 2007 (50 pages).
Extended European Search Report received in corresponding European application No. EP 087654562, dated May 16, 2012, 9 pages.
Mun et al.; "Fast Macro Mobility Handovers in HMIPv6;" Mipshop Working Group—Soongsil University; Jun. 1, 2007; 11 pages.
Office Action for European Application No. 08 765 456.2 dated Nov. 28, 2012 (5 pages).
Office Action for Japanese Patent Application No. 2007-160702 dated Sep. 4, 2012, with English translation thereof (3 pages).

* cited by examiner

PATH ESTABLISHMENT METHOD, ACCESS NETWORK SWITCHING METHOD, ACCESS NETWORK SWITCHING APPARATUS, MOBILE STATION, AND PROXY ACCESS NETWORK SWITCHING APPARATUS

TECHNICAL FIELD

The present invention relates to a field of mobile communications and specifically relates to a path establishment method, an access network switching method, an access network switching apparatus, a mobile station, and a proxy access network switching apparatus.

BACKGROUND ART

MIP (Mobile IP) is under consideration as a scheme for providing mobility to a mobile station in an IP network. According to MIP, the mobile station uses two IP addresses: a home address and a care-of address, to continue communications. The home address is a permanent IP address allocated to the mobile station in the IP network. The care-of address is assigned according to an IP address configuration scheme such as DHCP (Dynamic Host Configuration Protocol). When the mobile station receives the care-of address, the mobile station reports the care-of address as Binding Update to a mobility anchor apparatus (home agent). The mobility anchor apparatus manages the correspondence between the home address and the care-of address and continues communications with the mobile station using the care-of address. According to MIP, since the mobile station controls the change of the path due to its mobility, a bearer for the mobile station is not established in the network.

In a mobile communication network, on the other hand, the bearer for the mobile station may be established in the network for the purpose of the change of the path. For example, in a network to which GTP (GPRS Tunneling Protocol) or PMIP (Proxy Mobile IP) is applied, the bearer for the mobile station is established in the core network (see 3GPP TS23.401 and TS23.402). As used herein, the bearer is a communication path which is established to transmit user data. Each bearer is defined by its properties such as communication quality.

FIG. 1 shows an example of such a mobile communication system. Typically, the mobile communication system has a layered structure including a core network and an access network. The core network is mainly responsible for call control and service control, while the access network controls or terminates the radio technology or the wired technology. The core network includes a mobility anchor apparatus 10 which achieves mobility as call control such as handover by switching different access networks. For example, when the mobility anchor apparatus 10 receives user data from an external network, the mobility anchor apparatus 10 switches access networks according to the location of the mobile station 30 to relay the user data to the mobile station 30. According to GTP and PMIP, the core network includes access apparatuses 20 at the edges of the core network. The access apparatus 20 is responsible for connection control when the mobile station 30 connects to the access network. According to GTP and PMIP, bearers are established between the mobility anchor apparatus 10 and access apparatuses 20.

When the mobile station 30 communicates in the access network to which PMIP is applied, the mobile station 30 transmits a path switching signal (Proxy Binding Update) to the access apparatus 20, as is the case with MIP. Upon receiving the path switching signal, the access apparatus 20 transmits a bearer establishment signal. When the bearer is established, the mobility anchor apparatus 10 switches to an appropriate access network. When the mobile station 30 communicates in the access network to which GTP is applied, the path is established basically in the same manner as in the access network to which PMIP is applied.

DISCLOSURE OF INVENTION

Problem(s) to be Solved by the Invention

As shown in FIG. 1, the mobility anchor apparatus 10 can accommodate the access network to which GTP is applied, the access network to which PMIP is applied, and the access network to which MIP is applied. In this mobile communication system, when the mobile station 30 transmits the path switching signal to the mobility anchor apparatus 10 according to MIP, the mobility anchor apparatus 10 can switch to the access network in which the mobile station 30 is situated. In the network to which MIP is applied, the mobility anchor apparatus 10 switches to the access network upon receiving the path switching signal. In the access network to which GTP or PMIP is applied, on the other hand, the mobility anchor apparatus 10 establishes a bearer to the access network to switch paths upon receiving the path switching signal.

FIG. 2 shows a procedure for switching access networks when the mobile station 30 moves from an access network 1 to which MIP is applied to an access network 2 to which PMIP is applied. While the mobile station 30 is situated in the coverage area of the access network 1, the mobility anchor apparatus 10 communicates with the mobile station 30 using the home address and the care-of address (S101). When the mobile station 30 enters the coverage area of the access network 2, the mobile station 30 performs connection control such as authentication for the access network 2 (S103). When the mobile station 30 enters the coverage area of the access network 2, the mobile station 30 transmits a path switching signal to report the location of the mobile station 30 to the mobility anchor apparatus 10. Upon receiving the path switching signal, the access apparatus 20 transmits a bearer establishment signal (Proxy Binding Update) to the mobility anchor apparatus 10 (S105), and establishes a bearer between the mobility anchor apparatus 10 and the access apparatus 20 (S107). When the bearer is established, the mobility anchor apparatus 10 switches paths from the access network 1 to the access network 2 (S109).

As described above, the mobility anchor apparatus 10 equally handles the PMIP signal and the MIP signal. Accordingly, when the mobile station 30 moves from the access network to which MIP is applied to the access network to which PMIP is applied and then the mobility anchor apparatus 10 receives the bearer establishment signal (Proxy Binding Update), the mobility anchor apparatus 10 establishes the bearer and switches the access networks.

In this manner, the bearer cannot be established in advance in the mobile communication system. For this reason, when the mobile station 30 moves to the access network to which PMIP or GTP is applied, the establishment of the bearer together with handover is required. It may take much time to complete handover.

In addition, since handover is always performed upon the establishment of the bearer, the network and the mobile station do not control the trigger of handover. For this reason, when the mobile station 30 is situated near the boundary of the access network, handover may be frequently performed.

Furthermore, since the mobile station 30 communicates with the mobility anchor apparatus 10 to report the path switching signal and the home address, information about the mobility anchor apparatus 10 cannot be concealed in the mobile communication system.

In order to solve at least one of such problems, it is a general object of the present invention to flexibly and efficiently switch access networks or to conceal information about the apparatus for switching access networks.

Means for Solving the Problem(s)

In one aspect of the present invention, there is provided a path establishment method in a mobile communication system including a mobile station, an access apparatus for performing connection control between the mobile station and an access network, and a path establishing apparatus for establishing a path to communicate with the mobile station via the access network, including the steps of:
  establishing, by the mobile station, a first path to communicate with the access apparatus, when the mobile station enters a coverage area of the access apparatus;
  establishing, by the access apparatus, a second path to communicate with the path establishing apparatus, when the first path is established; and
  establishing, by the path establishing apparatus, a path to the mobile station, when a predetermined condition is satisfied.

In another aspect of the present invention, there is provided an access network switching method in a mobile communication system including a mobile station, an access apparatus for performing connection control between the mobile station and an access network, and an access network switching apparatus for switching access networks to communicate with the mobile station, including the steps of:
  establishing, by the mobile station, a first path to communicate with the access apparatus, when the mobile station enters a coverage area of the access apparatus;
  establishing, by the access apparatus, a second path to communicate with the access network switching apparatus, when the first path is established; and
  switching, by the access network switching apparatus, the access networks, when a predetermined condition is satisfied.

In another aspect of the present invention, there is provided an access network switching apparatus, connected to an access apparatus for performing connection control between a mobile station and an access network, for switching access networks to communicate with the mobile station, including:
  a path establishing unit configured to establish a second path to communicate with the access apparatus, when a first path is established between the mobile station and the access apparatus; and
  a path switching unit configured to switch access networks, when a predetermined condition is satisfied.

In another aspect of the present invention, there is provided a mobile station for communicating with an access network switching apparatus for switching access networks, including:
  a first path establishing unit configured to establish a first path to communicate with an access apparatus for performing connection control for an access network, when the mobile station enters a coverage area of the access apparatus;
  a second path establishing unit configured to establish a second path to communicate with the access network switching apparatus; and
  a path switching instructing unit configured to transmit a path switching signal to the access network switching apparatus, when a predetermined condition for switching access networks is satisfied.

In another aspect of the present invention, there is provided a mobile station for communicating with an access network switching apparatus for switching access networks, including:
  a first path establishing unit configured to establish a first path to communicate with an access apparatus for performing connection control for an access network, when the mobile station enters a coverage area of the access apparatus;
  a second path establishing unit configured to establish a second path to communicate with the access network switching apparatus; and
  a user data control unit configured to process user data via a switched access network, when a condition determined in advance by the access network switching apparatus is satisfied.

In another aspect of the present invention, there is provided a proxy access network switching apparatus connected to an access network switching apparatus for switching access networks to communicate with a mobile station; including:
  a transmitting unit configured to transmit or forward a path switching signal to the access network switching apparatus, when the proxy access network switching apparatus receives the path switching signal from the mobile station via an access apparatus for performing connection control between the mobile station and an access network.

Advantageous Effect of the Invention

According to an embodiment of the present invention, it is possible to flexibly and efficiently switch access networks or to conceal information about the apparatus for switching access networks.

DETAILED DESCRIPTION OF THE PREFERRED EMBODIMENTS

Description of Notations

Figure 1:
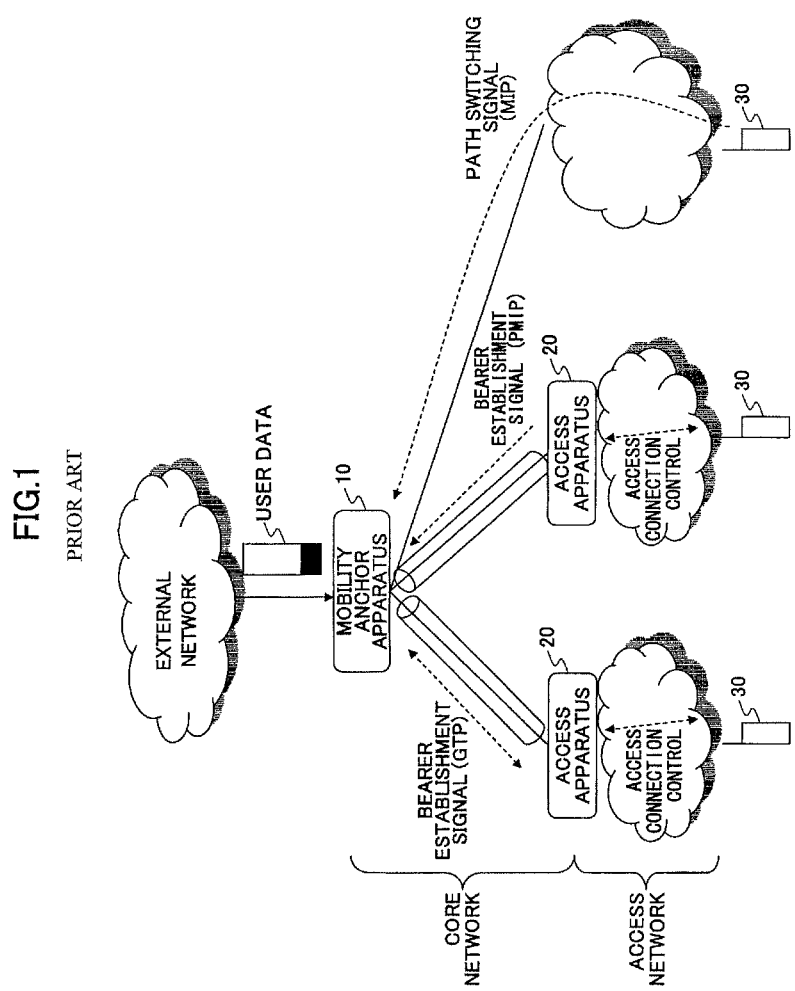
FIG. 1 shows an example of a mobile communication system.
Figure 2:
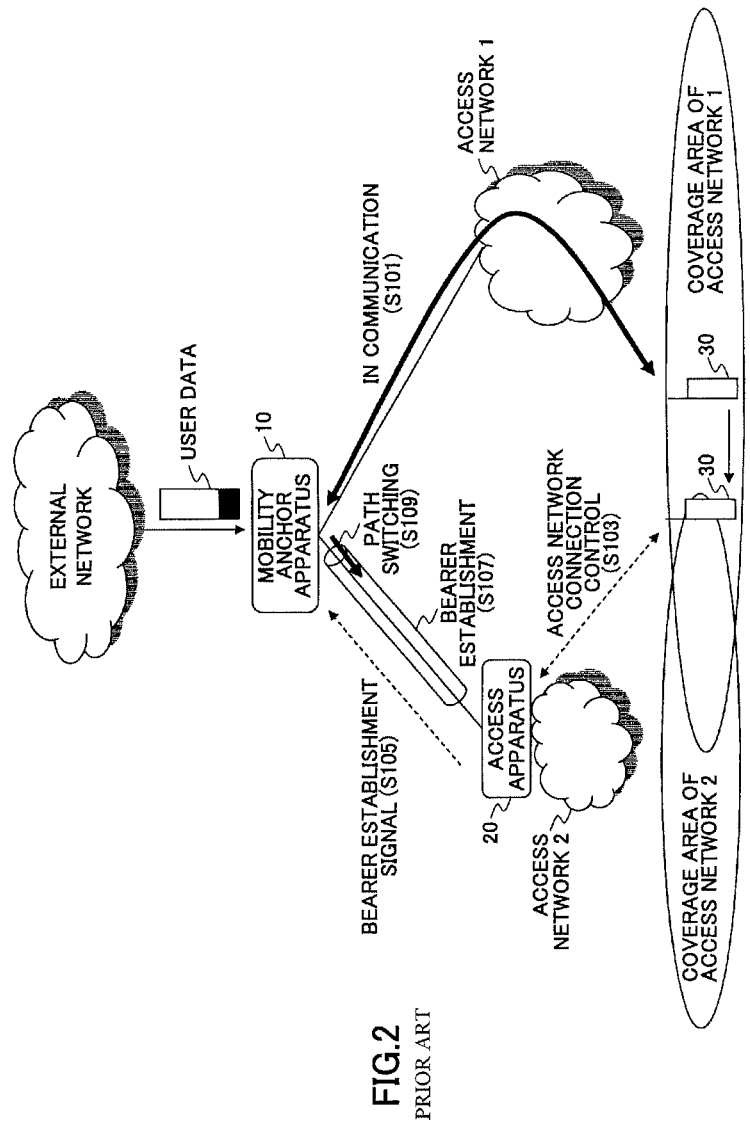
FIG. 2 shows a procedure for switching access networks in the mobile communication system shown in FIG. 1.

10 mobility anchor apparatus
101 packet transceiving interface unit
102 packet type determining unit
103 routing control unit
105 MIP path switching unit
107 MIP user data control unit
109 bearer user data control unit
111 bearer control unit
113 user address control unit
115 user address storage unit
117 handover condition instructing unit
20 access apparatus
30 mobile station
301 radio interface unit
303 access network control unit
305 core network control unit
307 handover instructing unit
309 handover determining unit
311 MIP user data control unit
313 upper application interface unit
40 proxy mobility anchor apparatus
401 packet transceiving interface unit
402 packet type determining unit
403 routing control unit
405 MIP path switching unit
407 MIP user data control unit
411 tunnel establishing unit
413 user address control unit
415 user address storage unit

BEST MODE OF CARRYING OUT THE INVENTION

With reference to the accompanying drawings, a description is given below with regard to embodiments of the present invention.

Figure 3:
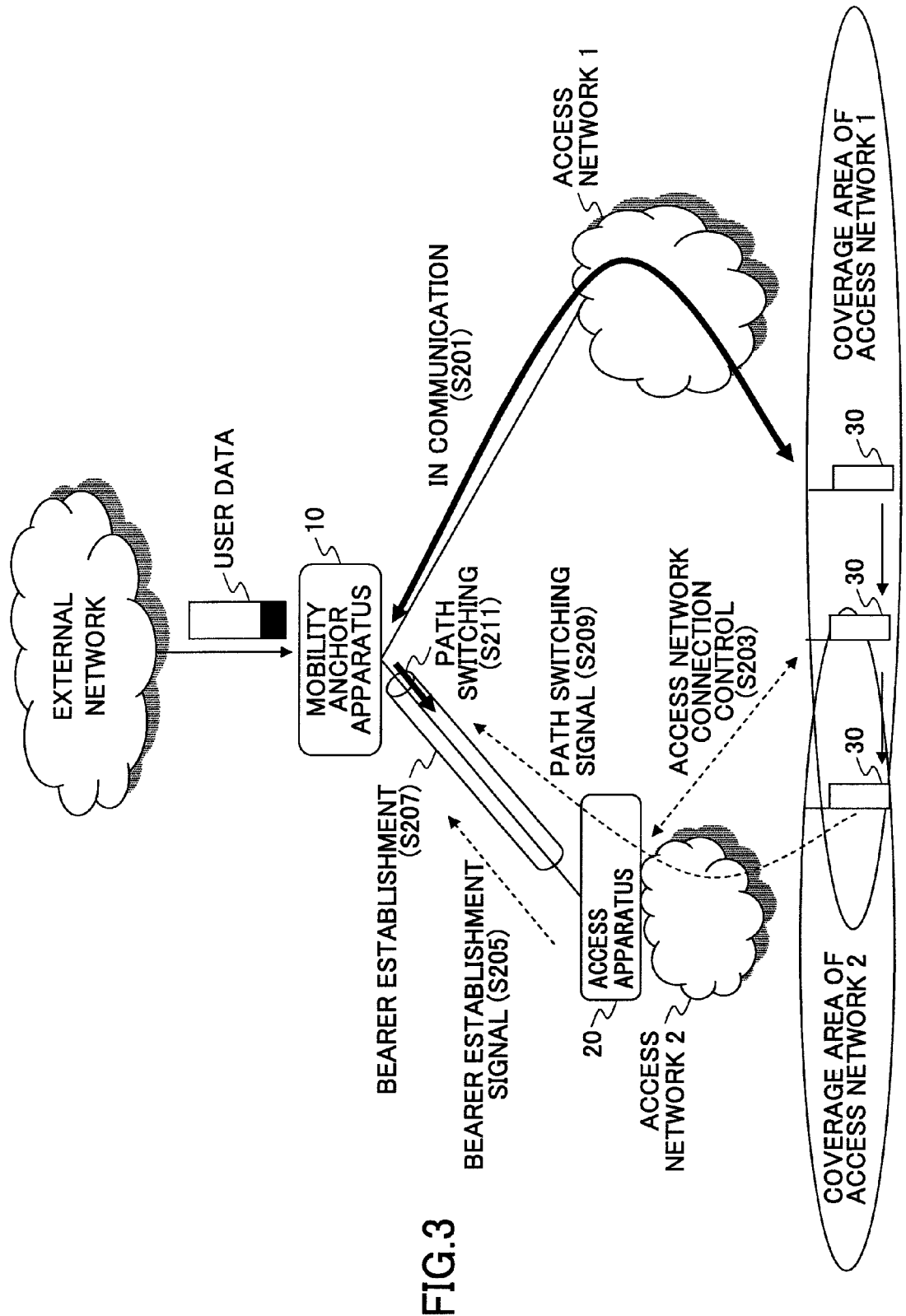
FIG. 3 shows a procedure for switching access networks in accordance with one embodiment of the present invention.

FIG. 3 shows a procedure for switching access networks in accordance with one embodiment of the present invention. Specifically, FIG. 3 shows a procedure for switching access networks when the mobile station 30 moves from an access network 1 to which MIP is applied to an access network 2 to which PMIP is applied. While the mobile station 30 is situated in the coverage area of the access network 1, the mobility anchor apparatus 10 communicates with the mobile station 30 using the home address and the care-of address (S201). When the mobile station 30 enters the coverage area of the access network 2, the mobile station 30 performs connection control such as authentication for the access network 2 (S203). After the connection control for the access network 2, the access apparatus 20 transmits a bearer establishment signal (Proxy Binding Update) to the mobility anchor apparatus 10 (S205), and establishes a bearer between the mobility anchor apparatus 10 and the access apparatus 20 (S207). When a condition for handover is satisfied, the mobile station 30 transmits a path switching signal (Binding Update) to the mobility anchor apparatus 10 (S209). Upon receiving the path switching signal, the mobility anchor apparatus 10 switches paths from the access network 1 to the access network 2 (S211).

In this manner, according to one embodiment of the present invention, it is possible to distinguish the switching of access networks from the establishment of the bearer. The procedure shown in FIG. 3 is also applicable to the case where the mobile station 30 moves from an access network to which MIP is applied to an access network to which GTP is applied. In addition, this procedure is also applicable to the case where the mobile station 30 moves from an access network to which GTP is applied to an access network to which PMIP is applied, as well as the case where the mobile station 30 moves from an access network to which PMIP is applied to an access network to which GTP is applied. In summary, the procedure shown in FIG. 3 is applicable to the case where the mobile station 30 moves to an access network in which a bearer is to be established between the access apparatus 20 and the mobility anchor apparatus 10.

As described below, the mobility anchor apparatus 10 may switch paths according to its own determination (according to a condition determined in advance by the mobility anchor apparatus 10), rather than according to the path switching signal from the mobile station 30. For example, the mobility anchor apparatus 10 may switch access networks when predetermined time has elapsed since the mobility anchor apparatus 10 received the bearer establishment signal.

<Procedure for Switching Access Networks in Accordance with a First Embodiment>

Figure 4:
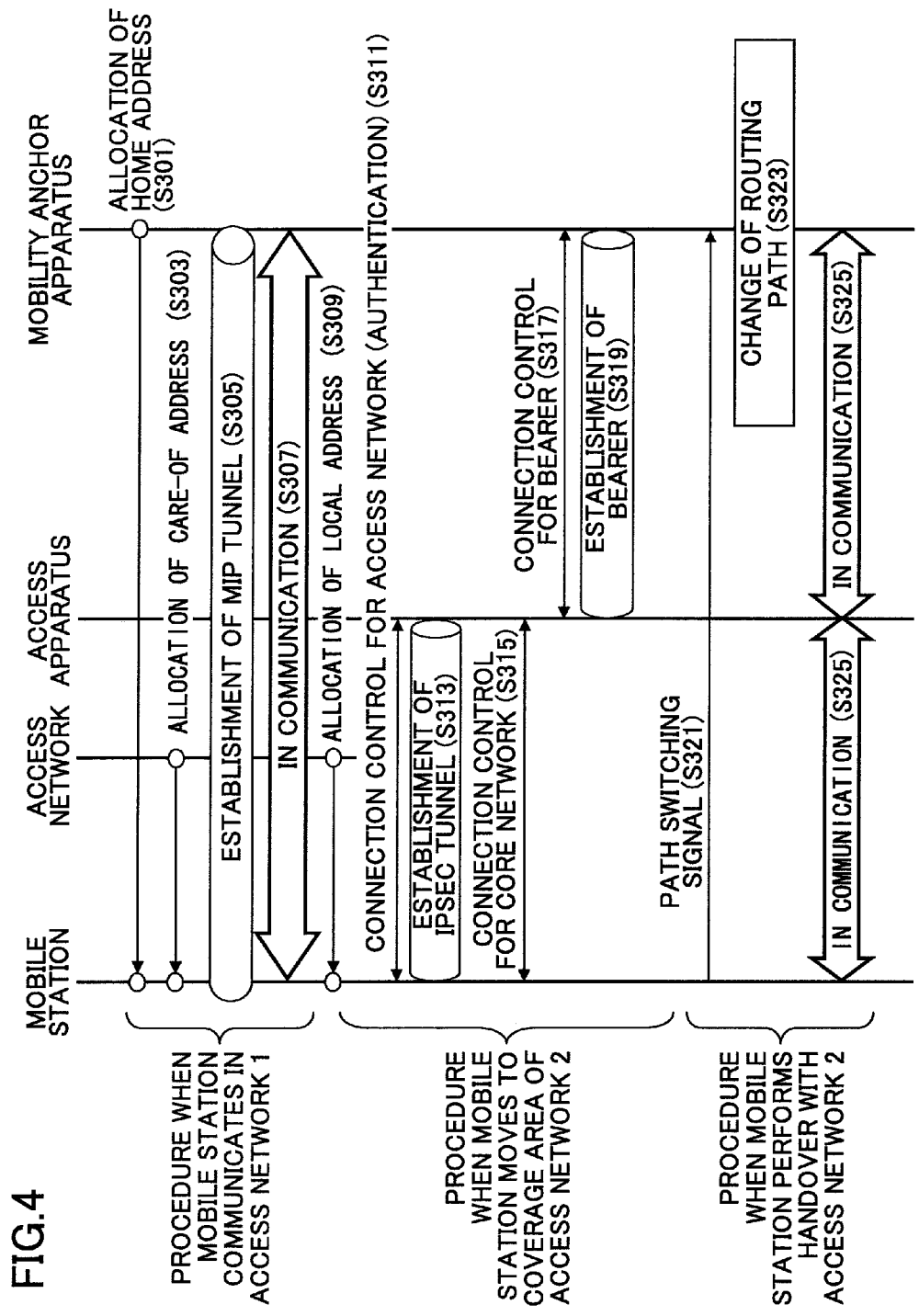
FIG. 4 shows a procedure for switching access networks in accordance with a first embodiment of the present invention (connection control according to PMIP).

With reference to FIG. 4, a procedure for switching access networks in accordance with a first embodiment is described below. FIG. 4 shows in detail the procedure for switching access networks when the mobile station 30 moves from the access network 1 to which MIP is applied to the access network 2 to which PMIP is applied.

When the mobile station 30 starts communications in the access network 1 to which MIP is applied, the mobile station 30 receives the home address allocated by the mobility anchor apparatus 10 (S301). The mobile station 30 further receives the care-of address allocated by the IP address assigning apparatus such as a DHCP apparatus in the access network (S303). Using these two addresses, a MIP tunnel is established between the mobile station 30 and the mobility anchor apparatus 10 (S305), and then communications are carried out (S307).

When the mobile station 30 moves to the coverage area of the access network 2 to which PMIP is applied, the mobile station 30 receives a local address allocated by the access network 2 (S309), and then performs connection control such as authentication for the access network 2 (S311). Using this local address, an IPSec tunnel is established between the mobile station 30 and the access apparatus 20 (S313). The local address is used only for establishing the IPSec tunnel. Then, the mobile station 30 performs connection control such as authentication for the core network (S315). In this step, the mobile station 30 may transmit information about the mobility anchor apparatus 10, the home address, and so on. Furthermore, in the step of connection control for the core network (S315), the access apparatus 20 may report the condition for handover to the mobile station 30. After the connection control for the core network, the access apparatus 20 transmits the bearer establishment signal to the mobility anchor apparatus 10 (S317), and then the bearer is established (S319). The access apparatus 20 may report the home address and the address of the access apparatus 20 to the mobility anchor apparatus 10 using, as the bearer establishment signal, Proxy Binding Update defined in PMIP. In this manner, the mobility anchor apparatus 10 can establish the bearer before switching access networks.

When the mobile station 30 enters the coverage area of the access network 2 and the condition for handover is satisfied, the mobile station 30 transmits the path switching signal to the mobility anchor apparatus 10 (S321). The mobile station 30 may report the home address to the mobility anchor apparatus 10 using, as the path switching signal, Binding Update defined in MIP. When the mobility anchor apparatus 10 receives the path switching signal (Binding Update), the mobility anchor apparatus 10 switches access networks (S323). In this manner, the mobility anchor apparatus 10 does not establish a new bearer upon receiving the path switching signal (Binding Update). The mobility anchor apparatus 10 may transmit a switching complete report (ACK) to the mobile station 30 after switching access networks. When access networks are switched, handover is completed and the mobile station 30 can communicate with the mobility anchor apparatus 10 via the access apparatus 20 (S325).

It should be noted that the access apparatus 20 may maintain the bearer established between the access apparatus 20 and the mobility anchor apparatus 10, even after the handover with the other access network by the mobile station 30. In this case, in the step of connection control for the core network (S315), the access apparatus 20 may determine whether the previously established bearer is maintained. When the previously established bearer is maintained, the step of connection control for the bearer (S317) and the step of the establishment of the bearer (S319) may not be performed.

In addition, plural bearers may be established between the access apparatus 20 and the mobility anchor apparatus 10. For example, in the step of connection control for the core network (S315), a message for preparing plural bearers may be transmitted, and then the plural bearer may be established between the access apparatus 20 and the mobility anchor apparatus 10. When the plural bearers are established, the mobile station 30 may transmit a signal for switching to the plural bearers together upon transmitting the path switching signal (S321). Alternatively, the mobile station 30 may transmit a signal for switching to one or more bearers among the plural established bearers.

<Procedure for Switching Access Networks in Accordance with a Second Embodiment>

Figure 5:
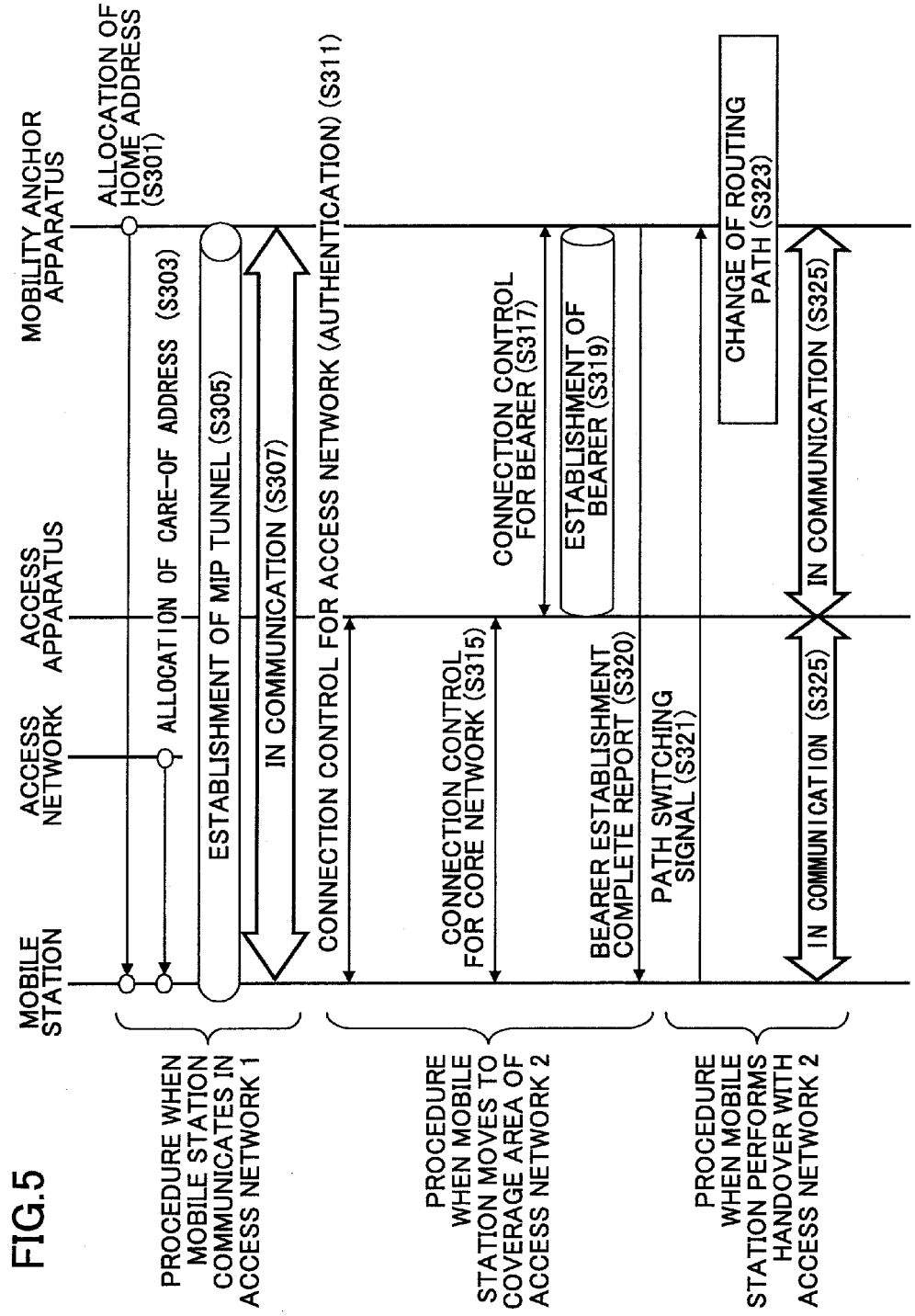
FIG. 5 shows a procedure for switching access networks in accordance with a second embodiment of the present invention (connection control according to GTP).

With reference to FIG. 5, a procedure for switching access networks in accordance with a second embodiment is described below. FIG. 5 shows in detail the procedure for switching access networks when the mobile station 30 moves from the access network 1 to which MIP is applied to the access network 2 to which GTP is applied.

This procedure is similar to the procedure shown in FIG. 4 except that the steps regarding the establishment of the IPSec tunnel (S309 and S313) are omitted according to GTP. When the mobile station 30 performs connection control for the core network (S315), the mobile station 30 may transmit information about the mobility anchor apparatus 10, the home address, and so on. After the connection control for the core network, the access apparatus 20 transmits the bearer establishment signal to the mobility anchor apparatus 10 (S317), and then the bearer is established (S319). After the establishment of the bearer, the mobility anchor apparatus 10 transmits a bearer establishment complete report to the mobile station 30 (S320). Alternatively, after the establishment of the bearer, the access apparatus 20 rather than the mobility anchor apparatus 10 may transmit the bearer establishment complete report to the mobile station 30. Then, handover is performed in the same manner as the first embodiment.

<Procedure for Switching Access Networks in Accordance with a Third Embodiment>

Figure 6:
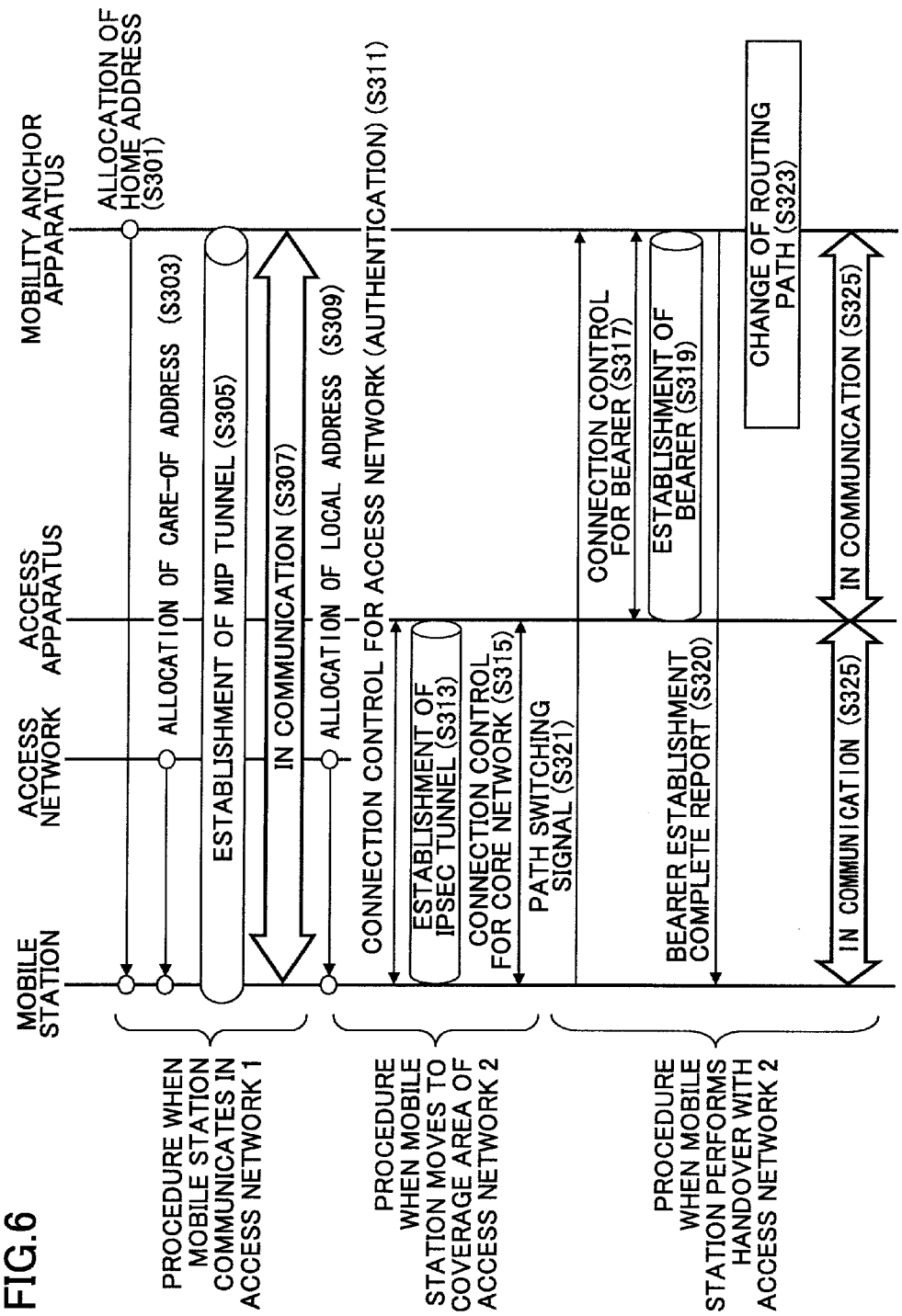
FIG. 6 shows a procedure for switching access networks in accordance with a third embodiment of the present invention (connection control according to PMIP).

With reference to FIG. 6, a procedure for switching access networks in accordance with a third embodiment is described below. The third embodiment shown in FIG. 6 is a modification of the first embodiment.

Typically, the mobile station 30 transmits the path switching signal after the establishment of the bearer as described in the first embodiment. However, it is possible for the mobile station 30 to perform handover before or during the establishment of the bearer. Specifically, the mobility anchor apparatus 10 receives the path switching signal from the mobile station 30 before the establishment of the bearer (S321). In this case, the mobility anchor apparatus 10 attempts to establish a bearer to the access apparatus 20 (S317). After the establishment of the bearer (S319), the mobility anchor apparatus 10 transmits the bearer establishment complete report to the mobile station 30 (S320) and switches access networks (S323). It should be noted that the mobility anchor apparatus 10 may transmit a response (ACK) to the path switching signal (S321) in the step of the bearer establishment complete report (S320).

<Procedure for Switching Access Networks in Accordance with a Fourth Embodiment>

Figure 7:
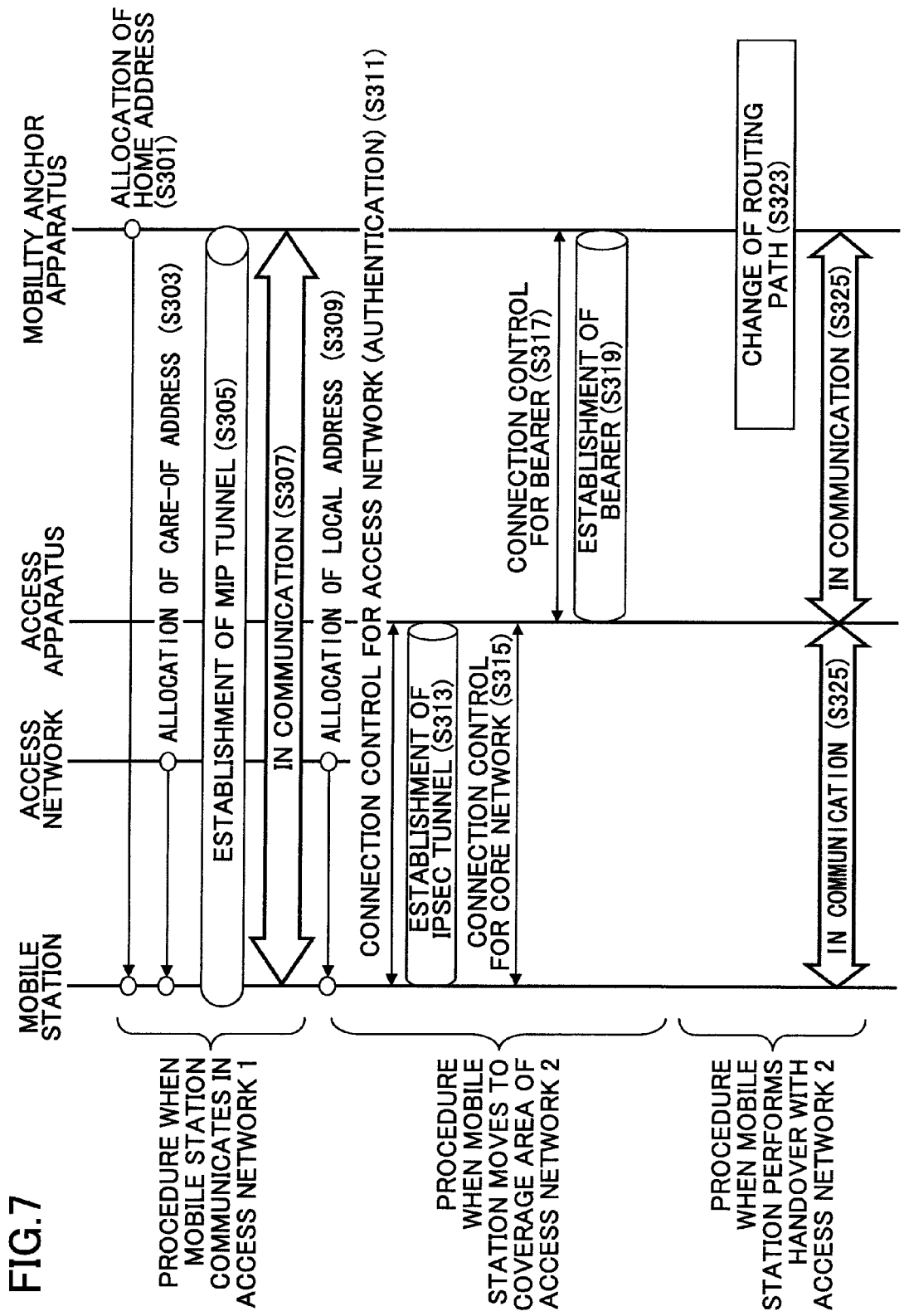
FIG. 7 shows a procedure for switching access networks in accordance with a fourth embodiment of the present invention (connection control according to PMIP).

With reference to FIG. 7, a procedure for switching access networks in accordance with a fourth embodiment is described below. The fourth embodiment shown in FIG. 7 is a modification of the first embodiment.

As described above, the mobility anchor apparatus 10 may switch paths according to its own determination, rather than according to the path switching signal from the mobile station 30. In this case, the path switching signal (S321) is not transmitted. For example, the mobility anchor apparatus 10 switches access networks (S323) when predetermined time has elapsed since the mobility anchor apparatus 10 received the bearer establishment signal. In this manner, handover may be performed based on the determination by the mobility anchor apparatus 10. Alternatively, handover may be performed based on the determination by the access apparatus 20.

In the step of connection control for the core network (S315), a message that handover is to be performed based on the determination by the mobility anchor apparatus 10 or the access apparatus 20 may be reported to the mobile station 30.

<Procedure for Switching Access Networks in Accordance with a Fifth Embodiment>

Figure 8:
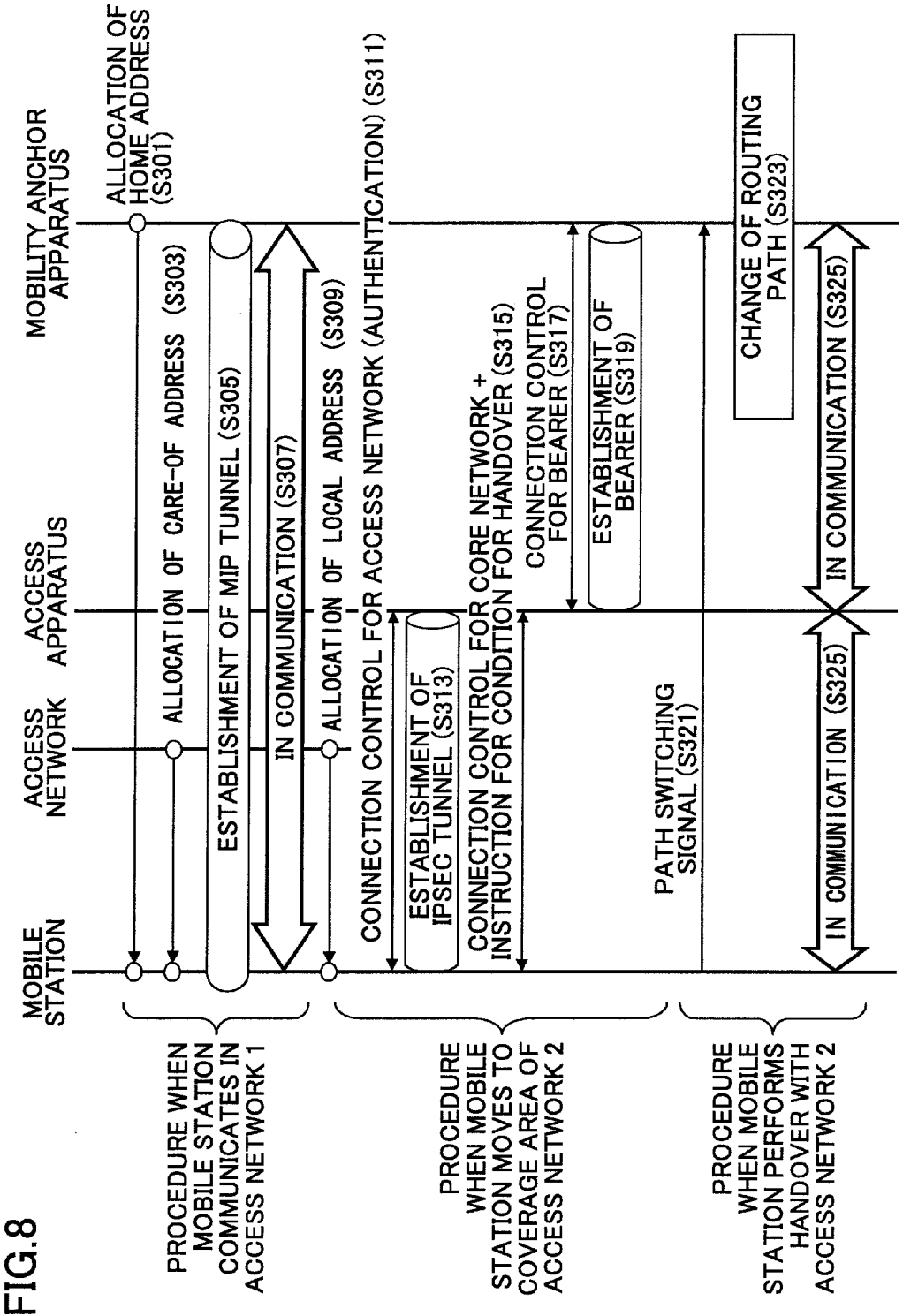
FIG. 8 shows a procedure for switching access networks in accordance with a fifth embodiment of the present invention (connection control according to PMIP).

With reference to FIG. 8, a procedure for switching access networks in accordance with a fifth embodiment is described below. The fifth embodiment shown in FIG. 8 is a modification of the first embodiment.

In the step of connection control of the core network (S315), the mobile station 30 receives the condition for handover from the access apparatus 20 or the mobility anchor apparatus 10. The condition for handover is control information representing the condition for performing handover. For example, the condition for handover may be the condition in that handover is performed when the radio condition is good after predetermined time. The condition for handover includes the condition in terms of time, the condition in terms of radio quality (communication rate, etc.), the condition in terms of the location, the condition in terms of the type of the access network, the condition in terms of radio (signal) strength, and so on. When the received condition for handover is satisfied, the mobile station 30 transmits the path switching signal (S321). Then, handover is performed in the same manner as the first embodiment.

<Procedure for Switching Access Networks in Accordance with a Sixth Embodiment>

Figure 9:
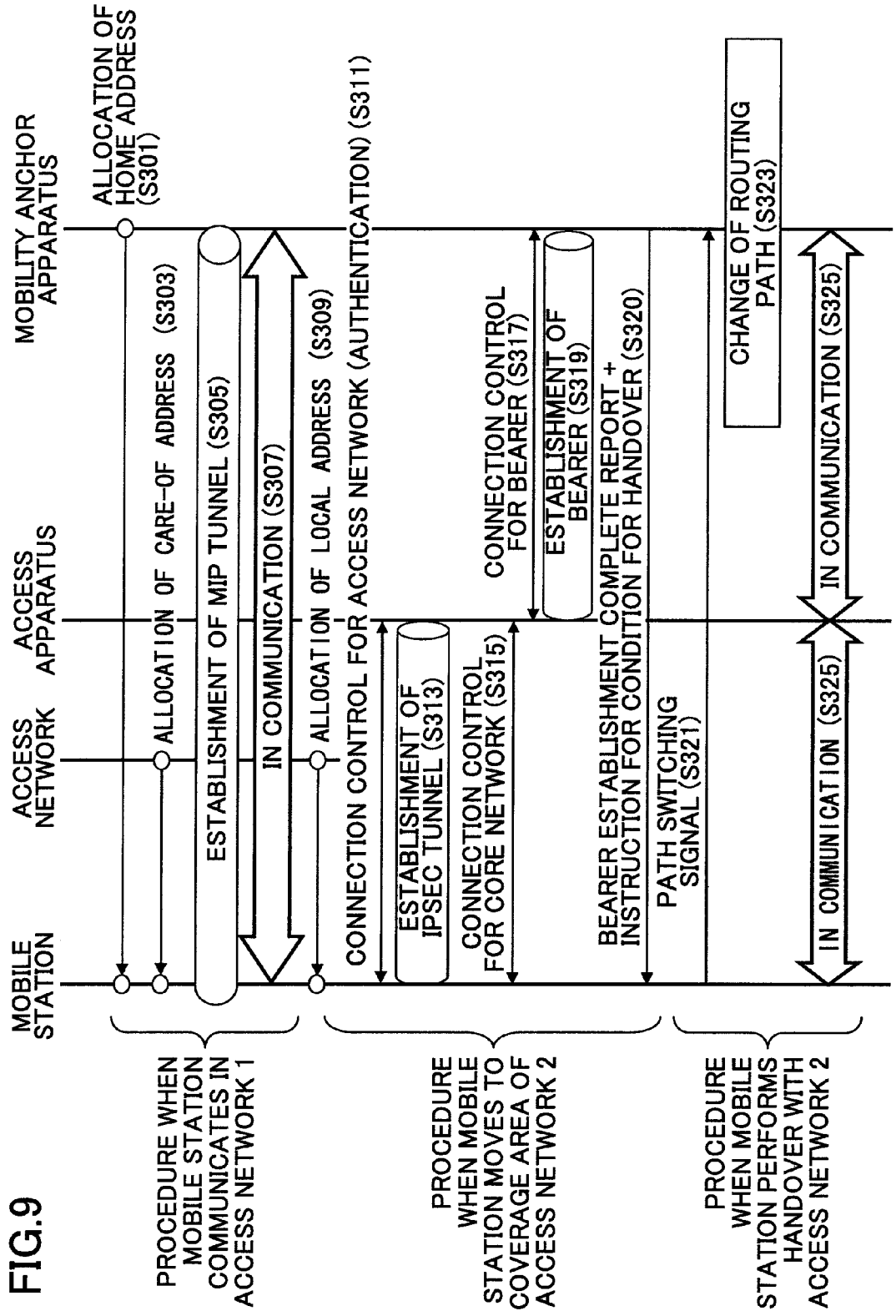
FIG. 9 shows a procedure for switching access networks in accordance with a sixth embodiment of the present invention (connection control according to PMIP).

With reference to FIG. 9, a procedure for switching access networks in accordance with a sixth embodiment is described below. The sixth embodiment shown in FIG. 9 is a modification of the fifth embodiment.

The mobile station 30 may receive the condition for handover along with the bearer establishment complete report (S320), rather than in the step of connection control for the core network (S315). When the received condition for handover is satisfied, the mobile station 30 transmits the path switching signal (S321). Then, handover is performed in the same manner as the fifth embodiment.

<Configuration of a Mobility Anchor Apparatus and its Operational Flow>

Figure 10:
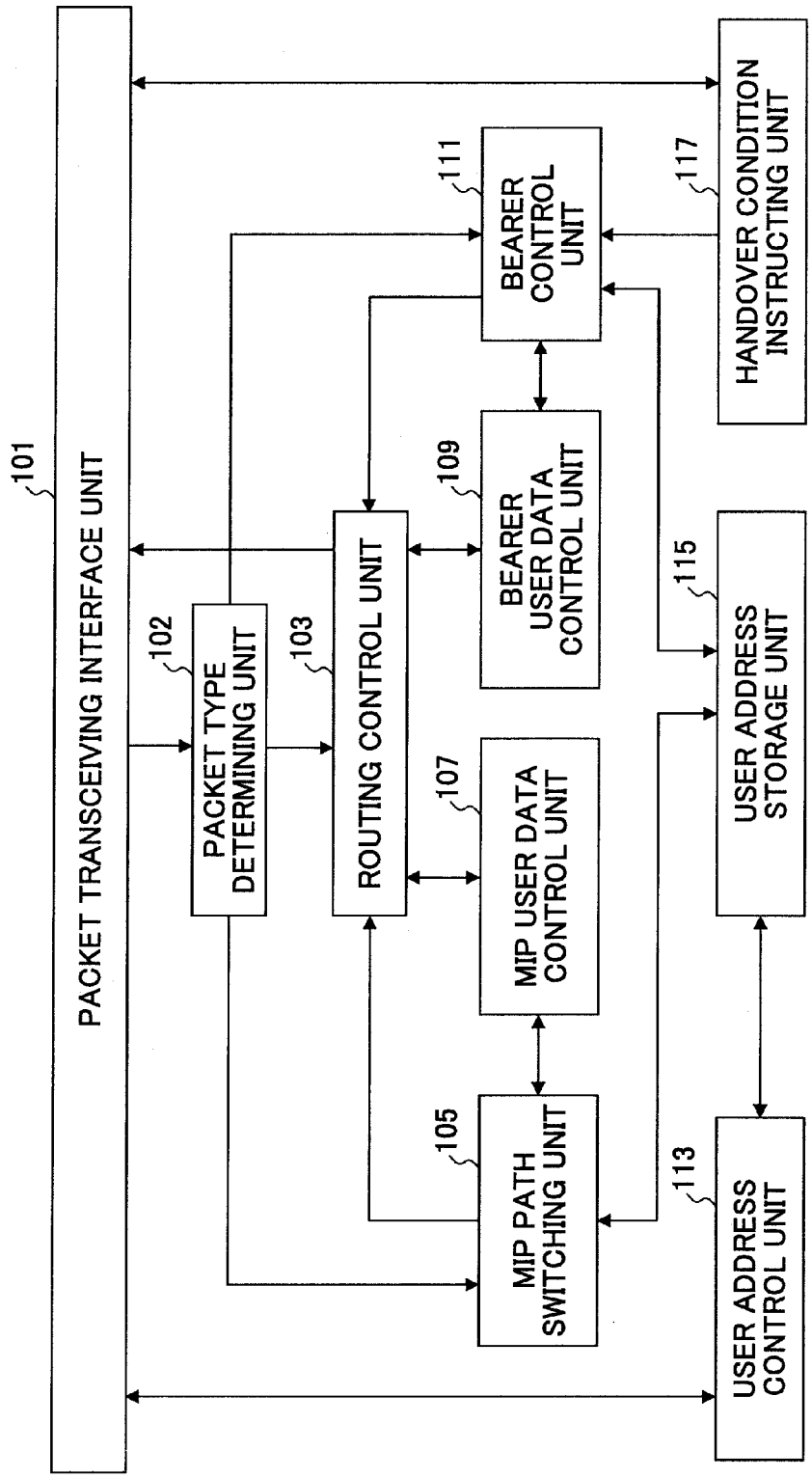
FIG. 10 shows a block diagram of a mobility anchor apparatus in accordance with one embodiment of the present invention.
Figure 11:
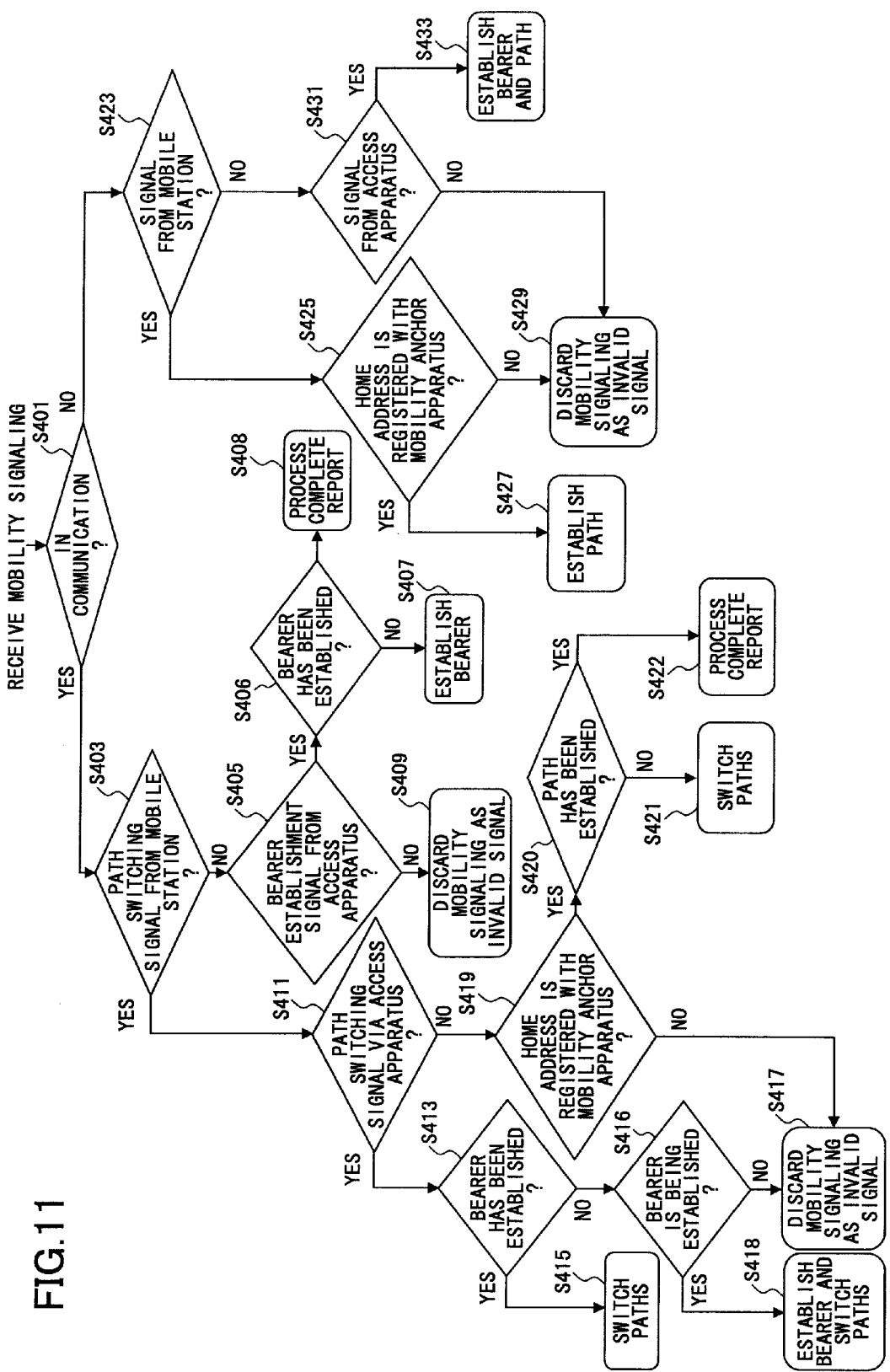
FIG. 11 shows a flowchart in a mobility anchor apparatus in accordance with one embodiment of the present invention.

With reference to FIGS. 10 and 11, the configuration of the mobility anchor apparatus 10 and its operational flow are described.

FIG. 10 shows a block diagram of the mobility anchor apparatus 10. The mobility anchor apparatus 10 includes a packet transceiving interface unit 101, a packet type determining unit 102, a routing control unit 103, a MIP path switching unit 105, a MIP user data control unit 107, a bearer user data control unit 109, a bearer control unit 111, a user address control unit 113, a user address storage unit 115, and a handover condition instructing unit 117.

The packet transceiving interface 101 transmits and receives packets to and from the access network or the external network. Specifically, the packet transceiving interface 101 transmits and receives user data, receives bearer establishment signals from the access apparatus 20, and receives path switching signals from the mobile station 30 via the access network.

The packet type determining unit 102 determines whether the packet received by the packet transceiving unit 101 includes user data, a MIP path switching signal, or a PMIP or GTP bearer establishment signal or path switching signal. When the received packet includes user data, the user data is supplied to the routing control unit 103. When the received packet includes the bearer establishment signal or the path switching signal, the signal is supplied to the MIP path switching unit 105 or the bearer control unit 111 according to its protocol.

The routing control unit 103 receives the user data from the packet type determining unit 102, and then supplies the user data to the MIP user data control unit 107 or the bearer user data control unit 109. The user data is routed according to the user table managed by the routing control unit 103.

When the packet type determining unit 102 determines that the received packet includes the MIP path switching signal, the MIP path switching unit 105 sets or updates the path to the mobile station 30. Specifically, the path to the mobile station 30 is set (added, modified, or deleted) in the routing table in the routing control unit 103. Alternatively, the established bearer may be enabled or disabled.

According to MIP, since the care-of address of the mobile station 30 is used for communications, the mobility anchor apparatus 10 refers to information in the user address storage unit 115, which stores address information. The user address control unit 113 manages the correspondence between the home address and the care-of address of the mobile station 30, and the user address storage unit 115 stores the address information.

On the other hand, when the received packet includes the PMIP or GTP bearer establishment signal, the bearer control unit 111 establishes the bearer between the mobility anchor apparatus 10 and the access apparatus 20.

When the received packet includes the path switching signal for switching to the access network to which PMIP or GTP is applied, the bearer control unit 111 switches access networks. Specifically, the path to the mobile station 30 is set (added, modified, or deleted) in the routing table in the routing control unit 103. Alternatively, the established bearer may be enabled or disabled.

The handover condition instructing unit 117 instructs the mobile station 30 about the condition for handover. Assuming that handover is performed when a predetermined condition is satisfied based on the determination of the mobility anchor apparatus 10, the handover condition instructing unit 117 may control such determination. The handover condition instructing unit 117 may directly instruct the mobile station 30 about the condition for handover, or may insert the condition for handover into a portion of a control signal and instruct the mobile station 30 about the control signal via the bearer control unit 111. It should be noted that the handover condition instructing unit 117 may be included in the access apparatus 20.

FIG. 11 shows a detailed flowchart in the mobility anchor apparatus 10.

When the mobility anchor apparatus 10 receives mobility signaling (the bearer establishment signal or the path switching signal such as Proxy Binding Update or Binding Update), the mobility anchor apparatus 10 determines whether it is in communication with the mobile station 30 (S401). When the mobility anchor apparatus 10 is in communication with the mobile station 30, it is found that the mobile station 30 moves from one access network to another access network. In this case, handover is performed.

When the mobility anchor apparatus 10 is in communication with the mobile station 30 upon receiving the mobility signaling (S401: YES), it is determined whether the mobility signaling is the path switching signal (Binding Update) from the mobile station 30 (S403). When the mobility signaling is not the path switching signal from the mobile station 30 (S403: NO), it is determined whether the mobility signaling is the bearer establishment signal (Proxy Binding Update) from the access apparatus 20 (S405). When the mobility signaling is the bearer establishment signal from the access apparatus 20 (S405: YES), the mobility anchor apparatus 10 determines whether the bearer has been established (S406). When the bearer has not been established, the mobility anchor apparatus 10 establishes the bearer (S407). When the bearer has been established, the mobility anchor apparatus 10 transmits a process complete report such as ACK (S408). When the mobility signaling is not the bearer establishment signal from the access apparatus 20 (S405: NO), the mobility anchor apparatus 10 discards the mobility signaling as an invalid signal (S409).

When the mobility signaling is the path switching signal (Binding Update) from the mobile station 30 (S403: YES), it is determined whether the mobility anchor apparatus 10 receives the path switching signal via the access apparatus 20 (S411). When the mobility anchor apparatus 10 receives the path switching signal via the access apparatus 20, it is found that the access network is a PMIP or GTP network. In this case, it is determined whether the bearer has been established (S413). When the bearer has been established, the mobility anchor apparatus 10 switches to the PMIP or GTP access network (S415). When the bearer has not been established, the mobility anchor apparatus 10 determines whether the bearer is being established (S416). When the bearer is being established, the mobility anchor apparatus 10 waits for the completion of the establishment of the bearer and switches to the PMIP or GTP access network (S418). When the bearer is not being established, the mobility anchor apparatus 10 discards the mobility signaling as an invalid signal (S417). Alternatively, when the bearer has not been established, the mobility anchor apparatus 10 may establish the bearer to the access apparatus 20.

When the mobility anchor apparatus 10 receives the path switching signal not via the access apparatus 20 (S411: NO), it is found that the access network is a MIP network. In this case, the mobility anchor apparatus 10 checks the home address of the mobile station 30 (S419). When the home address is not registered, the mobility anchor apparatus 10 discards the mobility signaling as an invalid signal (S417). When the home address is registered (S419: YES), the mobility anchor apparatus 10 determines whether the path has been established (S420). When the path has not been established, the mobility anchor apparatus 10 establishes the path and switches to the MIP access network (S421). When the path has been established, the mobility anchor apparatus 10 transmits a process complete report such as ACK (S422).

When the mobility anchor apparatus 10 is not in communication with the mobile station 30 upon receiving the mobility signaling (S401: NO), it is found that the mobile station 30 starts communications in the access network. In this case, it is determined whether the mobility signaling is the signal (Binding Update) from the mobile station (S423). When the mobility signaling is the signal from the mobile station 30, the mobility anchor apparatus 10 checks the home address of the mobile station 30 (S425). When the home address is registered, the mobility anchor apparatus 10 establishes the path to the mobile station 30 (S427). When the home address is not registered, the mobility anchor apparatus 10 discards the mobility signaling as an invalid signal (S429).

When the mobility signaling is not the signal (Binding Update) from the mobile station 30 (S423: NO), it is determined whether the mobility signaling is the signal from the access apparatus 20 (S431). When the mobility signaling is the signal from the access apparatus 20, the mobility anchor apparatus 10 establishes the bearer to the access apparatus 20, and also establishes the path to the mobile station 30 via the access apparatus 20 (S433). When the mobility signaling is not the signal from the access apparatus 20, the mobility anchor apparatus 10 discards the mobility signaling as an invalid signal (S429).

<Configuration of a Mobile Station>

Figure 12:
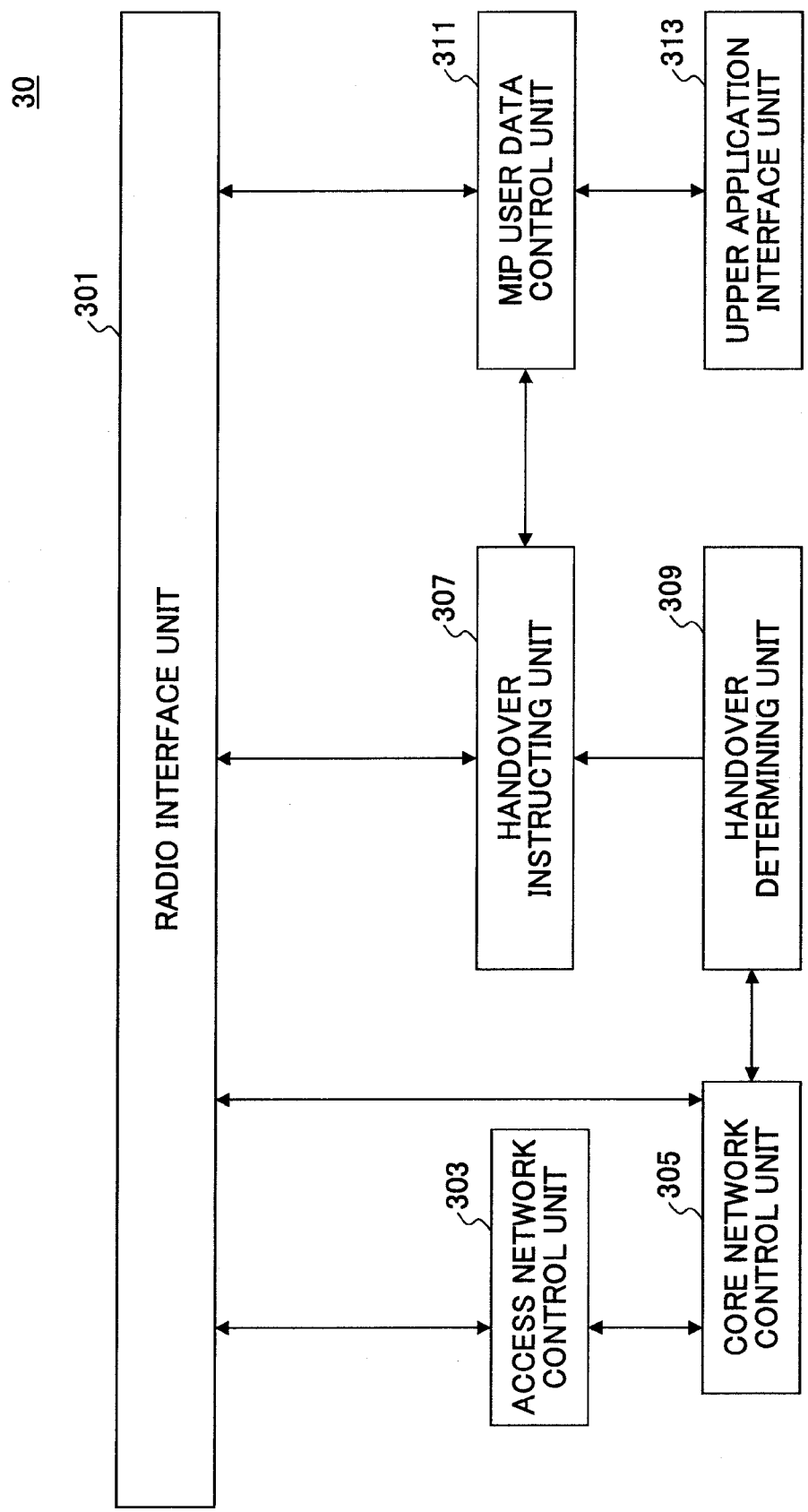
FIG. 12 shows a block diagram of a mobile station in accordance with one embodiment of the present invention.

With reference to FIG. 12, the configuration of the mobile station 30 is described below. FIG. 12 shows a block diagram of the mobile station 30. The mobile station 30 includes a radio interface unit 301, an access network control unit 303, a core network control unit 305, a handover instructing unit 307, a handover determining unit 309, a MIP user data control unit 311, and an upper application interface unit 313.

The radio interface unit 301 connects to the access network and transmits and receives data. The access network control unit 303 performs connection control such as authentication to connect to the access network. The core network control unit 305 performs connection control such as authentication to connect to the core network.

The handover instructing unit 307 transmits a path switching signal to the mobility anchor apparatus 10, when the condition for handover, which is determined by the handover determining unit 309, is satisfied. For example, when the handover determining unit 309 determines that the radio condition is good after predetermined time since the mobile station 30 moves from one access network to another access network, the handover instructing unit 307 transmits the path switching signal to the mobility anchor apparatus 10.

The MIP user control unit 311 transmits and receives user data to and from the upper application interface unit 313.

<Procedure for Switching Access Networks in Accordance with a Seventh Embodiment>

Figure 13:
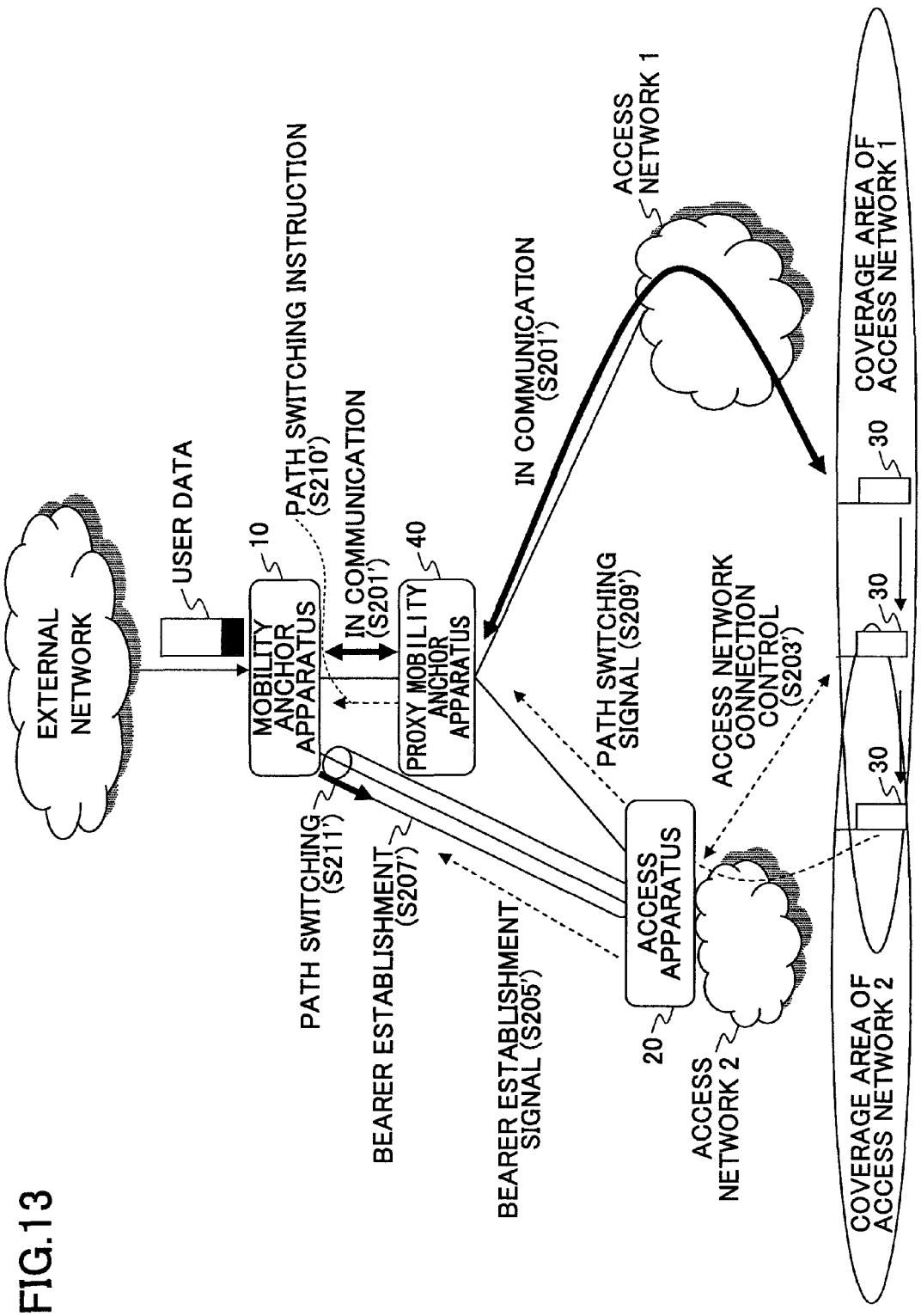
FIG. 13 shows a procedure for switching access networks in accordance with a seventh embodiment of the present invention.
Figure 14:
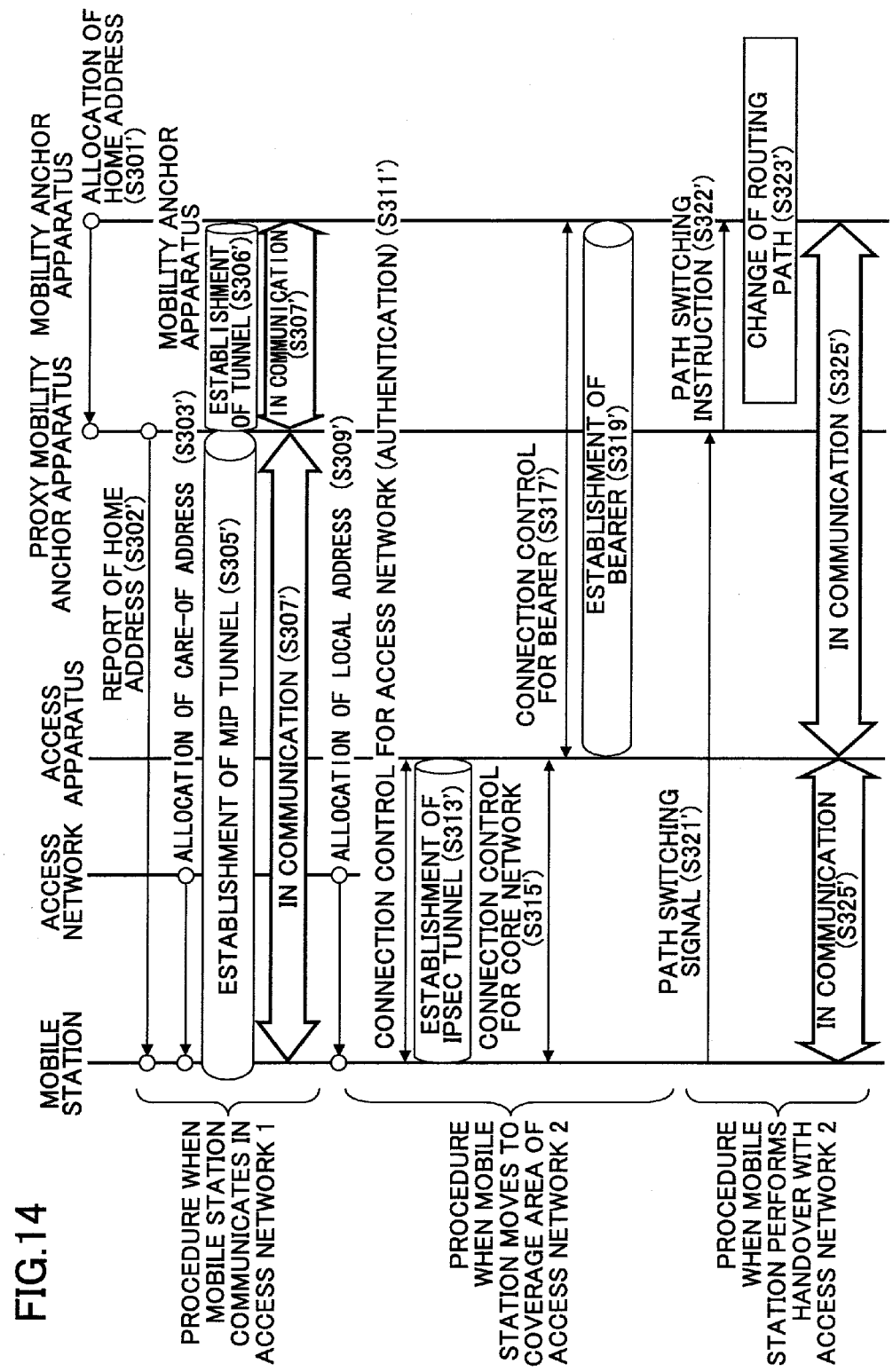
FIG. 14 shows a procedure for switching access networks in accordance with the seventh embodiment of the present invention (connection control according to PMIP).

With reference to FIGS. 13 and 14, a procedure for switching access networks in accordance with a seventh embodiment is described below. In the seventh embodiment, a proxy mobility anchor apparatus (or virtual mobility anchor apparatus) 40 is provided in order to conceal information about the mobility anchor apparatus 10. In this embodiment, the destination apparatus to which the mobile station 30 transmits mobility signaling is the proxy mobility anchor apparatus 40. The mobility anchor apparatus 10 receives the mobility signaling from the proxy mobility anchor apparatus 40 to switch access networks.

FIG. 13 shows a procedure for switching access networks when the mobile station 30 moves from an access network 1 to which MIP is applied to an access network 2 to which PMIP is applied. While the mobile station 30 is situated in the coverage area of the access network 1, the mobility anchor apparatus 10 communicates with the mobile station 30 via the proxy mobility anchor apparatus 40 (S201'). When the mobile station 30 enters the coverage area of the access network 2, the mobile station 30 performs connection control such as authentication for the access network 2 (S203'). After the connection control for the access network 2, the access apparatus 20 transmits a bearer establishment signal (Proxy Binding Update) to the mobility anchor apparatus 10 (S205'), and establishes a bearer between the mobility anchor apparatus 10 and the access apparatus 20 (S207'). When a condition for handover is satisfied, the mobile station 30 transmits a path switching signal (Binding Update) to the proxy mobility anchor apparatus 40 (S209'). The proxy mobility anchor apparatus 40 instructs the mobility anchor apparatus 10 to switch paths (S210'). Upon receiving the path switching signal, the mobility anchor apparatus 10 switches paths from the access network 1 to the access network 2 (S211').

In this manner, providing the proxy mobility anchor apparatus 40 allows the mobile station 30 to communicate with the proxy mobility anchor apparatus 40. Accordingly, the mobile station 30 needs only to know information about the proxy mobility anchor apparatus 40, and thus information about the mobility anchor apparatus 10 can be concealed.

FIG. 14 shows in detail the procedure shown in FIG. 13.

When the mobile station 30 starts communications in the access network 1 to which MIP is applied, the mobile station 30 receives, via the proxy mobility anchor apparatus 40, the home address allocated by the mobility anchor apparatus 10 (S301' and S302'). The mobile station 30 further receives the care-of address allocated by the IP address assigning apparatus such as a DHCP apparatus in the access network (S303'). Using these two addresses, a MIP tunnel is established between the mobile station 30 and the proxy mobility anchor apparatus (S305'). At the same time, a tunnel is established between the proxy mobility anchor apparatus 40 and the mobility anchor apparatus 10 (S306'). Then, the mobile station 30 communicates with the mobility anchor apparatus 10 via the proxy mobility anchor apparatus 40 (S307').

When the mobile station 30 moves to the coverage area of the access network 2 to which PMIP is applied, the mobile station 30 receives a local address allocated by the access network 2 (S309'), and then performs connection control such as authentication for the access network 2 (S311'). Using this local address, an IPSec tunnel is established between the mobile station 30 and the access apparatus 20 (S313'). The local address is used only for establishing the IPSec tunnel. Then, the mobile station 30 performs connection control such as authentication for the core network (S315'). In this step, the mobile station 30 may transmit information about the proxy mobility anchor apparatus 40, the home address, and so on. After the connection control for the core network, the access apparatus 20 transmits the bearer establishment signal to the mobility anchor apparatus 10 (S317'), and then the bearer is established (S319').

When the mobile station 30 enters the coverage area of the access network 2 and the condition for handover is satisfied, the mobile station 30 transmits the path switching signal (Binding Update) to the proxy mobility anchor apparatus 40 (S321'). When the proxy mobility anchor apparatus 40 receives the path switching signal, the proxy mobility anchor apparatus 40 instructs the mobility anchor apparatus 10 to switch access networks (S322'). This instruction may be a mere relay of the path switching signal or another control signal. When the mobility anchor apparatus 10 receives this instruction, the mobility anchor apparatus 10 switches access networks (S323'). When access networks are switched, handover is completed and the mobile station 30 can communicate with the mobility anchor apparatus 10 via the access apparatus 20 (S325').

<Configuration of a Proxy Mobility Anchor Apparatus>

Figure 15:
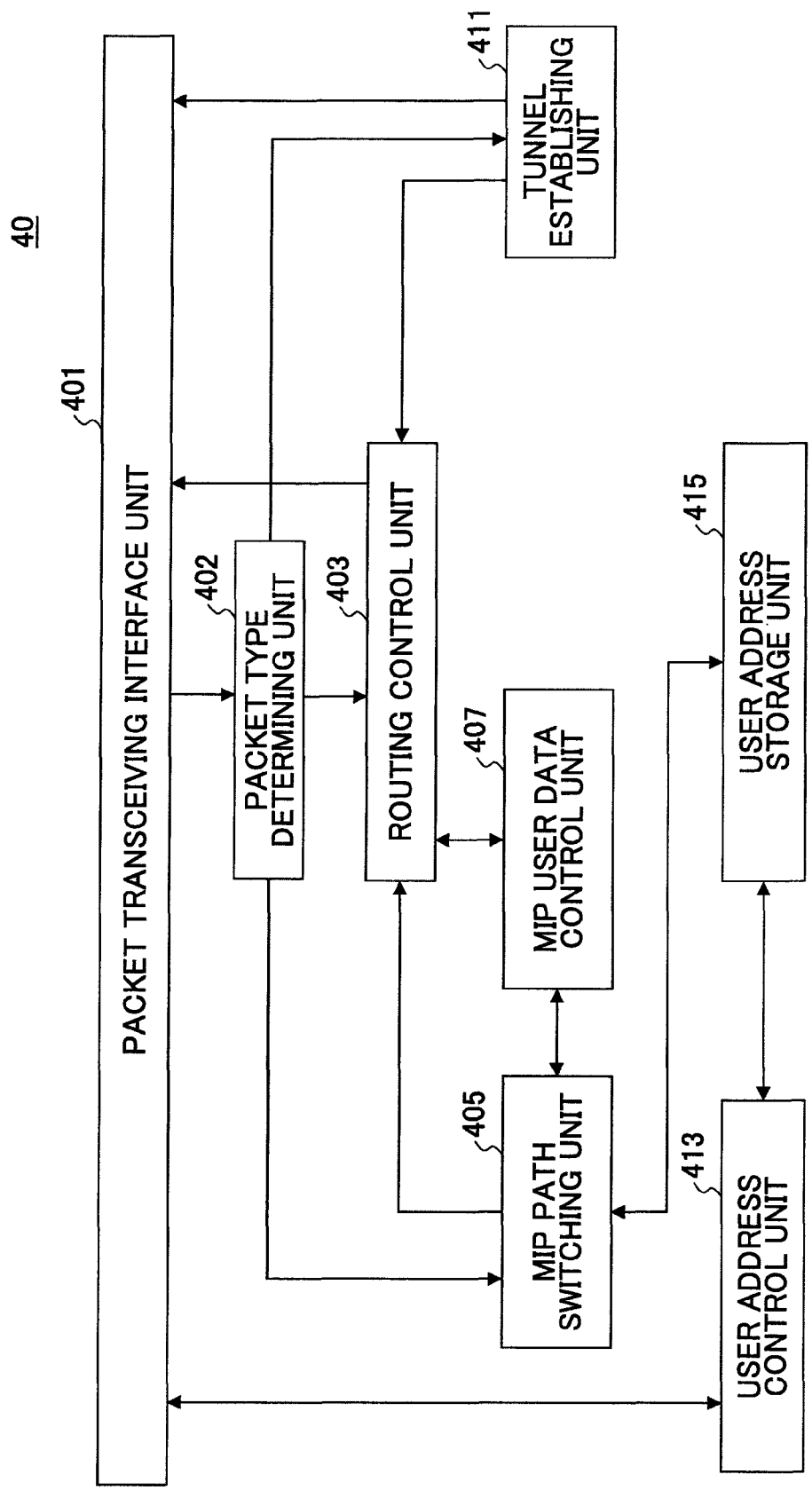
FIG. 15 shows a block diagram of a proxy mobility anchor apparatus in accordance with one embodiment of the present invention.

FIG. 15 shows a block diagram of the proxy mobility anchor apparatus 40. The proxy mobility anchor apparatus 40 includes a packet transceiving interface unit 401, a packet type determining unit 402, a routing control unit 403, a MIP path switching unit 405, a MIP user data control unit 407, a tunnel establishing unit 411, a user address control unit 413, and a user address storage unit 415.

The packet transceiving interface 401 transmits and receives packets to and from the access network or the mobility anchor apparatus 10. Specifically, the packet transceiving interface 401 transmits and receives MIP user data and receives path switching signals from the mobile station 30 via the access network.

The packet type determining unit 402 determines whether the packet received by the packet transceiving unit 401 includes user data, a MIP path switching signal, or a path switching signal for switching to the PMIP or GTP access network. When the received packet includes user data, the user data is supplied to the routing control unit 403. When the received packet includes the path switching signal for switching to the PMIP or GTP access network, the packet type determining unit 402 instructs the mobility anchor apparatus 10 to switch paths.

The routing control unit 403 receives the MIP user data from the packet type determining unit 402, and then supplies the MIP user data to the MIP user data control unit 407. The MIP user data is routed according to the user table managed by the routing control unit 403.

When the packet type determining unit 402 determines that the received packet includes the path switching signal for switching to the MIP access network, the MIP path switching unit 405 sets the path to the mobile station 30. Specifically, the path to the mobile station 30 is set (added, modified, or deleted) in the routing table in the routing control unit 403. Alternatively, the established bearer may be enabled or disabled. In addition, the tunnel establishing unit 411 establishes a tunnel between the mobility anchor apparatus 10 and the proxy mobility anchor apparatus 40, in order to relay user data to the mobility anchor apparatus 10. In the case of MIP, the proxy mobility anchor apparatus 40 which receives the path switching signal (Binding Update) performs routing to the mobile station 30. For this purpose, the proxy mobility anchor apparatus 40 includes the MIP path switching unit 405 corresponding to the MIP path switching unit 105 in the mobility anchor apparatus 10 (FIG. 10), the MIP user data control unit 407 corresponding to the MIP user data control unit 107, the user address control unit 413 corresponding to the user address control unit 113, and the user address storage unit 415 corresponding to the user address storage unit 115.

When the received packet includes the path switching signal for switching to the PMIP or GTP access network, the path switching signal is forwarded or transmitted to the mobility anchor apparatus 10. The path switching signal itself may be merely forwarded to the mobility anchor apparatus 10. Alternatively, the path switching signal may be converted into control information to be transmitted. When the mobility anchor apparatus 10 receives the path switching signal, the mobility anchor apparatus 10 switches to the PMIP or GTP access network.

The present invention is not limited to these embodiments. The present invention may be modified within the scope of the claims. For example, although the second through seventh embodiments focus on connection control according PMIP, these embodiments are applicable to connection control according to GTP. In addition, embodiments of the present invention are applicable to any access network in which the bearer is established between the access apparatus and the mobility anchor apparatus.

It should be noted that the terms of the mobility anchor apparatus and the access apparatus are used to explain the embodiments of the present invention. The mobility anchor apparatus refers to any apparatus capable of establishing a path to communicate with the mobile station via the access network or any apparatus capable of switching access networks to communicate with the mobile station. The access apparatus refers to any apparatus capable of performing connection control between the mobile station and the access network and establishing a path for mobile station to communicate with the mobility anchor apparatus. Furthermore, the term of the communication path such as the IP tunnel or the bearer is also used to explain the embodiments of the present invention. The communication path includes any path established according to another protocol.

This international patent application is based on Japanese Priority Application No. 2007-160702 filed on Jun. 18, 2007, the entire contents of which are incorporated herein by reference.

The invention claimed is:

1. An access network switching method in a mobile communication system including a mobile station, a first access apparatus, and an access network switching apparatus, comprising the steps of:
performing, by the first access apparatus, a connection control between the mobile station and a first access network, the first access network complying with GTP;
performing, by the second access apparatus, a connection control between the mobile station and a second access network, the second access network complying with PMIP;
establishing, by the mobile station, a connection to communicate with the access network switching apparatus via the second access apparatus before transmitting a path switching signal, when the mobile station enters a coverage area of the second access network while communicating over the first access network;
transmitting, by the mobile station, the path switching signal including an indication for switching to a particular bearer selected from plural bearers to the access network switching apparatus, the plural bearers being established in the second access network for communicating with the access network switching apparatus; and
switching, by the access network switching apparatus, from the first access network to the second access network to allow the mobile station to use the particular bearer, when the access network switching apparatus receives the path switching signal from the mobile station.

2. The access network switching method as claimed in claim 1, wherein:
the path switching signal is a Binding Update.

3. The access network switching method as claimed in claim 1, wherein:
when the access network switching apparatus receives the path switching signal from the mobile station while a connection between the second access apparatus and the access network switching apparatus has not been established,
the step of switching comprises establishing, by the access network switching apparatus, a connection to communicate with the mobile station via the second access apparatus and switching from the first access network to the second access network.

4. The access network switching method as claimed in claim 1, further comprising the steps of:
receiving, by the mobile station, a condition for switching access networks from the access network switching apparatus or the second access apparatus, wherein
the step of transmitting comprises transmitting, by the mobile station, the path switching signal when the condition for switching access networks is satisfied.

5. The access network switching method as claimed in claim 1, wherein:
the step of transmitting comprises transmitting, by the mobile station, a path switching signal to the access network switching apparatus via a proxy access network switching apparatus; and
the step of switching comprises switching from the first access network to the second access network, when the access network switching apparatus receives the path switching signal from the proxy access network switching apparatus.

6. An access network switching apparatus, connected to a first access apparatus and a second access apparatus, comprising:
a connection establishing unit configured to establish a connection to communicate with the mobile station via the second access apparatus before receiving a path switching signal, when the mobile station enters a coverage area of a second access network while communicating over a first access network, wherein a connection control between the mobile station and the first access network is performed by the first access apparatus and a connection control between the mobile station and the second access network is performed by the second access apparatus, the first access network complying with GTP and the second access network complying with PMIP; and
a path switching unit configured to switch access networks, when the path switching signal including an indication for switching, to a particular bearer selected from plural bearers is received from the mobile station, the plural bearers being established in the second access network for communicating with the mobile station.

7. The access network switching apparatus as claimed in claim 6, wherein:
the path switching signal is a Binding Update.

8. A mobile station for communicating with an access network switching apparatus, comprising:
a connection establishing unit configured to establish a connection to communicate with the access network switching apparatus via an access apparatus for performing connection control for a second access network before transmitting a path switching signal, when the mobile station enters a coverage area of the second access network while communicating over a first access network, wherein a connection control between the mobile station and the first access network is performed by a first access apparatus and a connection control between the mobile station and the second access network is performed by a second access apparatus, the first access network complying with GTP and the second access network complying with PMIP; and
a path switching instructing unit configured to transmit the path switching signal including an indication for switching to a particular bearer selected from plural bearers to the access network switching apparatus, the plural bearers being established in the second access network for communicating with the access network switching apparatus.

9. The mobile station as claimed in claim 8, wherein:
the path switching signal is a Binding Update.

* * * * *